2,862,034
3,4-DIBENZYLOXY-β-NITROSTYRENES

Kenneth E. Hamlin, Lake Bluff, Ill., assignor to Abbott Laboratories, North Chicago, Ill., a corporation of Illinois No Drawing. Application June 16, 1955
Serial No. 516,043

4 Claims. (Cl. 260—613)

This invention relates to new chemical compounds of the 3-benzyloxy-β-nitrostyrene series characterized by the following structural formula.

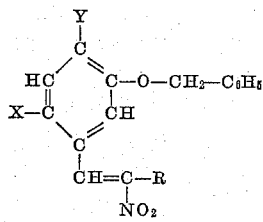

wherein R is a member of the group consisting of hydrogen and lower alkyl, X is a member of the group consisting of hydrogen and nitro and Y is a member of the group consisting of hydrogen and benzyloxy, with the further proviso that X and Y cannot both be hydrogen in the same compound.

It is an object of this invention to provide novel chemical substances of the foregoing type and method for producing them. The compounds of this invention are especially useful as intermediates in the synthesis of medicinally active compounds.

The 3-benzyloxy-6,β-dinitrostyrenes of this invention can be cyclized according to the method disclosed by Beer et al. in Journal of Chemical Society, vol. 3 (1951) pages 2029–32, to form 5-benzyloxyindoles. Indoles of this type can be converted to serotonin (5-hydroxytryptamine) by the method disclosed by Hamlin and Fischer in Journal of American Chemical Society, vol. 73, page 5007 (1951).

The 3,4-dibenzyloxy, β-nitrostyrenes disclosed herein can be converted to 3,4-dihydroxy phenethylamines by the well-known reaction of reducing the β-nitrostyrene with lithium aluminum hydride (see Burger, Medicinal Chemistry, vol. 1, page 315). The phenethylamines are well-known sympathomimetic drugs as disclosed in Burger (supra) on page 294. The reaction of a β-nitrostyrene to form a phenethylamine is likewise shown in Organic Reactions, vol. 6, page 482.

The new compounds are prepared generally by the reaction of a benzyloxybenzaldehyde with a nitroalkane such as nitromethane, nitroethane, nitropropane, or other lower nitroalkane, as set forth in detail in the examples. In a preferred process I have found that it is necessary to employ an excess of the nitroalkane which serves both as reactant and as solvent for the benzaldehyde derivative.

The invention is disclosed in further detail by means of the following examples which are set forth for the purpose of illustrating the invention but are in no way to be construed as limiting the invention in spirit or in scope. It will be apparent to chemists skilled in the art that many modifications in reagents and conditions can be adopted without departing from the intent and purpose of this invention, provided the modifications fall within the scope of the appended claims.

Example I 3,4-dibenzyloxy-β-nitrostyrene

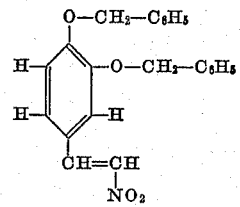

A solution of 35 g. (0.11 mole) of 3,4-dibenzyloxybenzaldehyde in 200 cc. of nitromethane is treated with 35 drops of n-amylamine. After standing overnight, the resulting crystalline precipitate of 3,4-dibenzyloxy-β-nitrostyrene is filtered and recrystallized from methanol; yield 20 g., melting at 118–119° C.

Example II 3,4-dibenzyloxy-β-methyl,β-nitrostyrene

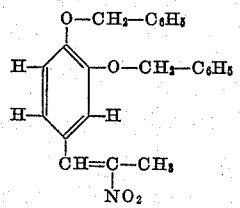

A solution of 35 g. (0.11 mole) of 3,4-dibenzyloxybenzaldehyde in 200 cc. of nitroethane is treated with 35 drops of n-amylamine. After standing one week, the solution was permitted to evaporate to dryness. The residual crystalline 3,4-dibenzyloxy β-methyl, β-nitrostyrene is recrystallized from ethanol and methanol; yield 38 g., melting at 117° C.

Example III 3,4-dibenzyloxy β-ethyl,β-nitrostyrene

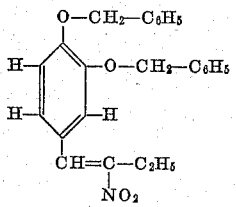

A solution of 50 g. (0.15 mole) of 3,4-dibenzyloxybenzaldehyde in 500 cc. of freshly distilled 1-nitropropane is treated with 50 drops of n-amylamine. After standing for one week, the solution is evaporated to dryness. The residual yellow crystalline mass is recrystallized from methanol and ethanol. The resulting 3,4-dibenzyloxy β-ethyl, β-nitrostyrene is obtained in 89% yield (54 g.) and has a melting point of 107° C.

Example IV 3-benzyloxy-6,β-dinitrostyrene

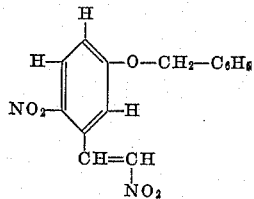

A mixture of 11.5 g. (0.045 mole) of 5-benzyloxy-2-nitrobenzaldehyde, 7 cc. of nitromethane, 5 g. of ammonium acetate and 55 cc. of glacial acetic acid is refluxed for two hours. The material is poured into water and the resulting solid is filtered, washed with water and dried. This solid, which is 3-benzyloxy-6,β-dinitrostyrene weighing 9 g., is recrystallized from diluted acetone after treatment with decolorizing carbon; yield 6.4 g., melting at 145–146° C.

*Example V*

3-benzyloxy-6,β-dinitrostyrene

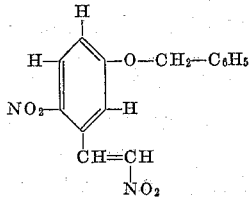

A solution of 26 g. (0.1 mole) of 5-benzyloxy-2-nitrobenzaldehyde in 150 cc. of nitromethane is treated with 26 drops of n-amylamine. After standing for 5 days, the mixture is evaporated to dryness and the resulting yellow crystals, of 3-benzyloxy 6,β-dinitrostyrene weighing 20 g., are recrystallized from diluted acetone; yield 15 g., melting point 145–146° C.

*Example VI*

3,4-dibenzyloxy-6,β-dinitrostyrene

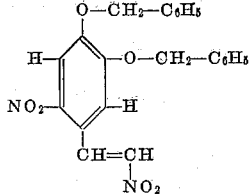

A solution of 4.4 g. of 3,4-dibenzyloxy-6-nitrobenzaldehyde in 75 cc. of nitromethane is treated with 5 drops of n-amylamine. After standing for five days, the mixture is evaporated to dryness. The residual yellow crystalline material is recrystallized from ethyl acetate to yield the desired 3,4-dibenzyloxy-6,β-dinitrostyrene which melts at 159–160° C.

*Example VII*

1 g. of 3-benzyloxy-6,β-dinitrostyrene is mixed with 11 cc. of ethanol, 11 cc. of acetic acid and 3 g. of iron powder (Beer et al. Journal of Chemical Society (1951) vol. 3, pages 2029–32) and refluxed for ten minutes when a precipitate is formed. A mixture of ethanol and water is added to the reaction mixture and the whole is filtered. The filtrate is diluted with water, neutralized with sodium bicarbonate and extracted with ether. The ether extracts are dried and evaporated and the crystalline residue, 5-benzyloxyindole, weighing 0.8 g. is obtained. This product is converted to serotonin.

This application is a continuation in part of my co-pending application Serial No. 292,970, now abandoned, which was filed June 11, 1952.

Others may readily adapt the invention for use under various conditions of service, by employing one or more of the novel features disclosed or equivalents thereof. As at present advised with respect to the apparent scope of my invention, I desire to claim the following subject matter.

I claim:
1. A new compound of the general formula

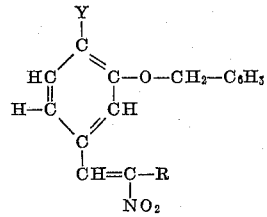

wherein R is a member of the group consisting of hydrogen and lower alkyl and Y is benzyloxy.
2. 3,4-dibenzyloxy-β-nitrostyrene.
3. 3,4-dibenzyloxy-β-methyl,β-nitrostyrene.
4. 3,4-dibenzyloxy-β-ethyl,β-nitrostyrene.

References Cited in the file of this patent

UNITED STATES PATENTS 2,601,282   Heinzelman _____ June 24, 1952
2,698,345   Speeter _____ Dec. 28, 1954

OTHER REFERENCES

Rosenmund: Berichte, vol. 46, pg. 1039 (1913).
Ginsberg: Chem. Abstracts, vol. 45, pgs. 625–6 (1951).
Fuson & Snyder: Organic Chemistry; 2d Ed., John Wiley & Sons, N. Y. (1954) pg. 44.